Figure 1:
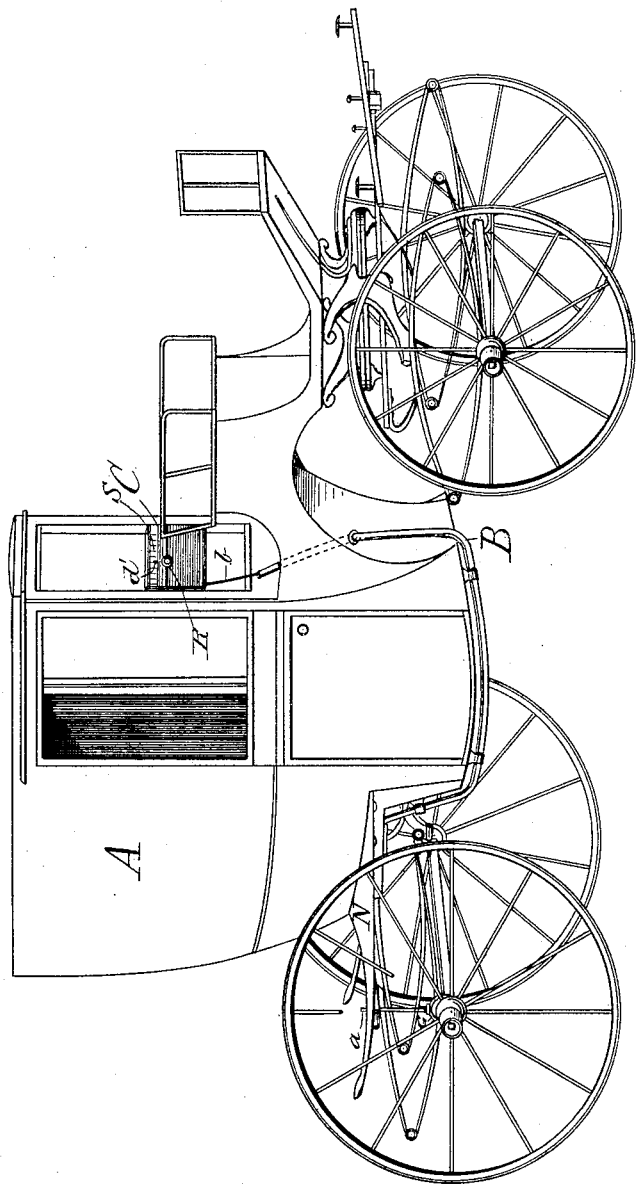

(No Model.) 3 Sheets—Sheet 1.

E. SCHUCHARDT.
DISTANCE REGISTER FOR VEHICLES.

No. 318,511. Patented May 26, 1885.

WITNESSES
Wm. A. Lowe
Tallmadge W. Foster

INVENTOR
Emil Schuchardt
by Augustus T. Gurlitz
Attorney (No Model.) 3 Sheets—Sheet 2.
E. SCHUCHARDT.
DISTANCE REGISTER FOR VEHICLES.
No. 318,511. Patented May 26, 1885.
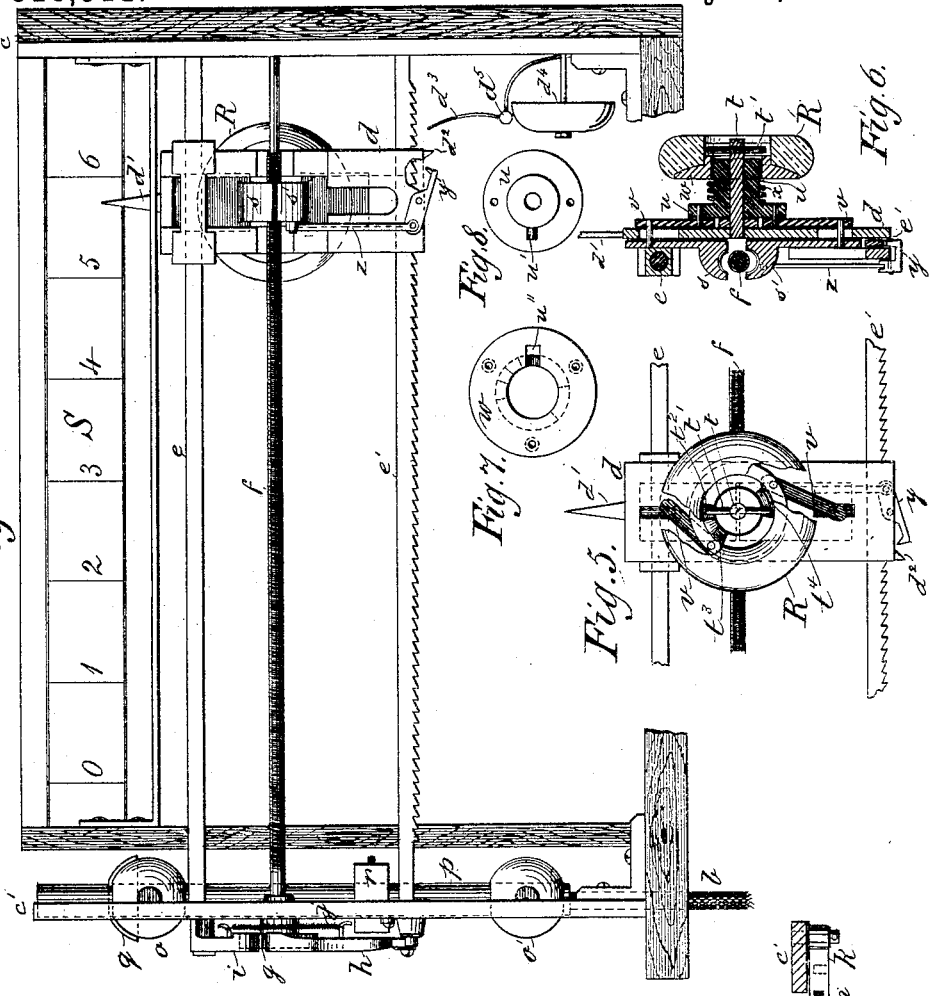

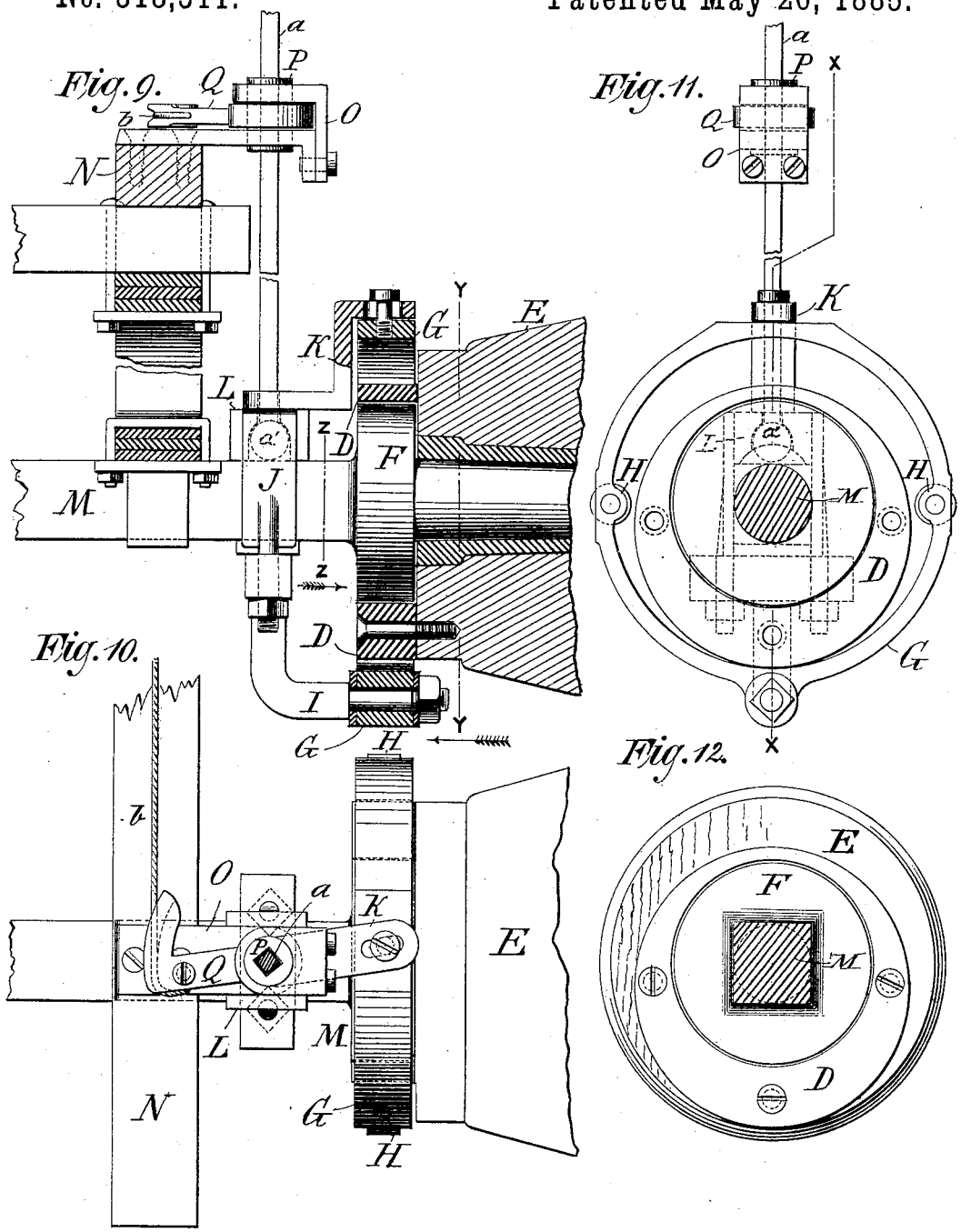

UNITED STATES PATENT OFFICE.

EMIL SCHUCHARDT, OF NEW YORK, N. Y.

DISTANCE-REGISTER FOR VEHICLES.

SPECIFICATION forming part of Letters Patent No. 318,511, dated May 26, 1885.

Application filed September 17, 1884. (No model.)

*To all whom it may concern:*

Be it known that I, EMIL SCHUCHARDT, of the city and county of New York, in the State of New York, have invented a certain new and useful Distance Measurer and Indicator for Vehicles; and I do hereby declare that the following is a full, clear, and exact description of the invention, which will enable others skilled in the art to which it appertains to make and use the same, reference being had to the accompanying drawings, which form a part of this specification.

The object of this invention is to provide a vehicle with a convenient device to measure the distance over which it has traveled, and an indicator to show that distance to the passenger and the driver, such indicator being arranged near the driver's seat and in full view of both the passenger and driver, and so that the driver has ready access thereto; and it consists of a measurer adjusted to the running-gear and an indicator co-operating with it on the body of the vehicle by the peculiar construction, arrangement, and combination of the various parts, all as more fully hereinafter set forth and claimed.

Figure 1 is a view of a brougham with the invention attached. Fig. 2 is a perspective view from behind of the indicator without any case around it. Fig. 3 is an end view of the same. Fig. 4 is a top view of the lever $k$ and engaging-piece $r$, showing also the tongue $m$ and spring $n$. Fig. 5 is a front view of the index-carrier. Fig. 6 is a cut section of the same. Figs. 7 and 8 are details of the parts for setting the index-carrier. Fig. 9 is a rear view of the axle and hub, showing the measure and means for attaching the same. Fig. 10 is a top view of the same. Fig. 11 is a side view of the same as it appears looking from the line $y\,y$ on Fig. 9 in the direction of the arrow. Fig. 12 is an end view of the hub looking from the line $z\,z$ on Fig. 9 in the direction of the arrow, and shows the eccentric ring D as attached to the hub E.

Similar letters of reference indicate like parts in all the drawings.

A is a vehicle to which my invention is attached. $a$ is a square rod, which operates the arm Q, Fig. 10. B is a tube in which is disposed the connecting-rope $b$, between the measurer and indicator, and this tube should be brought up to the indicator-case, it being left shorter in the drawings to show the parts more clearly. C is the indicator in its case, shown in this instance arranged on the front of the window of the vehicle.

Fig. 2 shows the arrangement of the indicator in the case C, which case is not shown, as it may be of any suitable size and style to protect and inclose the mechanical parts, a flat square box answering the purpose very well. $c\,c'$ are uprights to which the parts may be conveniently attached. Between these moves the index-carrier $d$ on the ways $e\,e'$, and this is actuated by the threaded rod $f$. This threaded rod $f$ terminates in the ratchet $g$, which is actuated by the pawl $h$, and held in place by the pawl $i$, these being connected by the spring $j$, as shown, which holds them to the ratchet and draws them toward each other. The pawl $h$ is pivoted to the reciprocating lever $k$, which in turn is pivoted to the upright $c'$. The upward movement of the lever $k$ is limited by the stop $l$, attached to the upright $c'$. The lever $k$ is provided for engagement with the tongue $m$, which is pivoted in a slot in the lever $k$, as shown clearly in Fig. 4, and is held in the position shown by the spring $n$, while it is prevented from going out farther beyond the end of the lever $k$ by its shoulder $n'$, which rests against the lower face of the lever $k$ and beyond the slot. It is capable of being pushed upward against the action of the spring $n$.

On the upright $c'$ are attached two sleeves, $o\,o'$, in which moves the hollow rod $p$, containing the spring $p'$, the lower end of which is fastened to the rod $p$, near its lower end, and the upper end of which is fastened to the cross-piece $q$, which rests in a slot in the rod $p$ and in a similar slot in the sleeve $o$. This rod $p$ carries the engaging-piece $r$, which has a sloping engaging-face, and is so adjusted relatively to the tongue $m$ of the lever $k$ that when the lever $k$ has been pushed down far enough to turn the ratchet-wheel $g$ to the extent of one spur the tongue $m$ will then be so far down that any further downward movement of the rod $p$ will cause the engaging-piece $r$ to pass by the tongue $m$ and release it from engagement, and the lever $k$ will be drawn back by the spring $j$ until it strikes the stop $l$ and assumes again the position shown in Fig. 3, and when the rod $p$ moves upward again the sloping face of the piece $r$ pushes inward the tongue $m$ against the action of the spring $n$, and the engaging-piece $r$ passes the lever $k$ and assumes again the position shown in Fig. 3.

To the lower end of the hollow rod $p$ the wire rope $b$ is attached, which, when drawn by the arm Q, pulls down the rod $p$, and with it the engaging-piece $r$, moving the pawl $h$ to turn the ratchet $g$ to the extent of one spur and no farther, and when the wire rope $b$ is pushed back again by the arm Q the spring $p'$ aids in drawing the rod $p$ up again.

The index-carrier consists of a suitable frame, $d$, grooved to slide on the rods or ways $e\ e'$, and carries a pair of threaded jaws, $s\ s'$, which are capable of being opened and closed around the screw-rod $f$ and engage with the same. These jaws slide in grooves in the carrier $d$, and are opened and closed by means of the handle R.

To the carrier $d$ is attached the dead-spindle $t$, which has a hole near its outer end, through which passes the pin $t'$, and this pin $t'$ passes into and engages with the slots $t^4$ and $t^2$ or $t^4$ and $t^3$ on the face of the collar $w$, and prevents the same from turning, as shown in Fig. 5. Upon the spindle is mounted the sleeve $u$, to which are attached the arms $v\ v$, which are also attached to the jaws $s\ s'$ and actuate the same.

On one side of the narrow neck of the sleeve $u$ is a pin, $u'$, which engages in the slot $u''$ on the collar $w$, which collar $w$ is attached to the inner side of the handle R.

Around the neck of the sleeve $u$ is arranged the spring $x$, which bears against the shoulder of the sleeve $u$ and against the collar $w$ and forces them apart, thereby keeping the pin $t'$ engaged in the slots of the collar $w$ and preventing the turning of the handle R. When the jaws $s\ s'$ are closed around the rod $f$, the parts are in the position shown in Fig. 5. When it is desired to open them to set the index $d'$, the handle R is pushed inward against the action of the spring $x$, the slot $u''$ in the collar $w$ permitting its passage over the pin $u'$ of the sleeve $u$, and the handle is pushed inward until the pin $t'$ is out of engagement with the slots $t^4$ and $t^2$ and the handle can be turned. The handle is then turned to the right, (Fig. 5,) which moves the arms $v\ v$, and with them the jaws $s\ s'$, respectively upward and downward and separates them, as shown in Fig. 6. When the handle R is released, the spring $x$ pushes it out again, and the pin $t'$ engages with the slots $t^4$ and $t^3$—the lower one and the upper left-hand one—which indicates that the jaws are open, and, if desired, the slots may be marked, respectively, "open" and "closed," or otherwise, to indicate that fact. The index-carrier $d$ can then be pushed back by means of the handle R until the index $d'$ is set at zero.

To prevent the carrier being moved forward to increase the mileage indicated, the way $e'$ is notched on its lower face, and a catch, $y$, is pivoted to the frame $d$ and actuated by means of an arm, $z$, attached to the jaw $s'$. When the jaws $s\ s'$ are closed, this catch is out of engagement, as shown in Figs. 2 and 5; but when the jaws are opened the catch $y$ is thrown into engagement with the notches on the lower face of the way $e'$, as shown in Fig. 6. The thin part of the catch $y$ should be sufficiently elastic to allow it to move over the notches when the index is pushed toward zero. In the upper part of the case is arranged the index-scale S, which is made of suitable transparent material, and the case C is either cut away or has glazed portions corresponding to the scale S, so that both the driver and passenger may readily see the mileage. A slot is made in the front side of the indicator-case C wide enough to allow the neck of the sleeve $u$ to move within it from end to end, so that the handle R projects beyond the case, as shown in Fig. 1, and all the mechanism is inclosed. A bell or gong may be arranged in connection with the index-carrying device, so as to be struck when the index has reached the end of the scale and give notice thereof. In Fig. 2 I show a device convenient for that purpose. On the side of the case is a standard supporting the gong or bell $d^4$, and a spring, $d^3$, carrying a hammer, $d^5$, is also secured to the case. The free end of the spring is adjusted relatively to the index-carrier $d$, so that it will engage with some portion of it, $d^2$, toward the end of its movement, and will be disengaged and cause the hammer to strike the gong when the last mile-mark is reached.

The measuring device consists of the eccentric-ring D, secured to the inner end of the hub E around the collar F. The eccentric-strap G is adjusted to receive a forward and backward movement by the turning of the eccentric D, and is provided at the contact-points with the wheels H H, to lessen friction in operation, and it is supported from beneath by the arm I, which is secured to the lower part of the clip J.

Upon the upper part of the strap G is secured one end of the rocking arm K by means of a screw, which passes through a slot in it, and thereby permits lateral movement to the arm K, as well as forward and back movement. The other end of the rocking arm K is provided with a square hole, into which fits the square rod $a$. This rod $a$ terminates in a ball, $a'$, which plays in an ample socket provided for it in the piece L, which is secured on the upper face of the axle M by means of the clip J.

The foregoing-described mechanism of the measuring device being attached to the running-gear of the vehicle moves upon the plane of the running-gear, and the body of the vehicle being mounted on springs is therefore at different times in a different relative position thereto.

To some portion of the body of the vehicle, or of those parts which move upon the same plane with it, (in the instance of my invention shown in the drawings to the bar N,) is secured the floating carrier O, which moves up and down on the rod $a$ as the body of the vehicle moves up and down. The thimble P is adjusted to turn easily in the carrier O, and has a square central opening in which plays the square rod $a$, and to the thimble P is rigidly attached the arm Q, to which is secured the wire rope $b$.

The method of operation is as follows: As the axle E turns with the movement of the vehicle, the eccentric D operates upon the strap G, giving to it and to the end of the arm K attached to it a forward and back movement. By means of the rod $a$ this movement is in turn communicated to the arm Q, which alternately pushes forward and draws back the wire rope $b$. The effect of this on the registering-instrument is that for each revolution of the hub E the ratchet $g$ is advanced one spur and the index $d'$ is carried forward correspondingly. It will be seen that the float O provides for any up-and-down movement of the body of the vehicle, while the ball-and-socket joint at the lower termination of the rod $a$ and the slot in the end of the rocking arm K, where it is connected to the strap G, provide for any lateral movement that may be imparted to the body by the wheels running into ruts or from other causes. The tube B should be shaped to the body of the vehicle, so that it will make no abrupt turns and present only curves, thus doing away with unnecessary friction, and it may be placed beneath or above the body of the vehicle, or between the frame of the vehicle and its lining, and passing above or below the door, as may be desired; but I prefer to place it beneath the body, as shown in the drawings, as it is out of the way there, and can be readily attached to any vehicle without much alteration of the body. I also prefer to use the stiff wire rope, as that is not only drawn back, but is also pushed forward by the working of the arm Q and requires very little aid from the spring $p'$. The indicator may of course be made for longer or shorter distances, as desired, and its scope will depend upon the closeness of the threads on the rod $f$ and the number of spurs on the ratchet $g$. For example, if the carriage-wheel is fifteen feet in circumference it will make three hundred and fifty-two revolutions to the mile. If the ratchet $g$ is provided with sixteen spurs, it will be turned on its axis twenty-two times by the three hundred and fifty-two revolutions, and therefore if the pitch of the thread on the rod $f$ is twenty-two to the inch the mile-marks will be at that distance.

To arrange my invention on vehicles I attach the indicator, the tube B, and the measuring device in the desired positions, run the wire rope through the tube B, and connect the parts. It is well to work the rope a little while in the tube until it assumes the shape of the curves of the tubes before connecting the parts. The gage may then be marked conveniently by obtaining the circumference of the wheel to which the measuring device is attached, ascertaining the number of revolutions required to make a mile, and then turning the wheel that number of times, and then marking the point occupied by the index $d'$ on the scale, and so on until the gage is marked to its full capacity.

This device is composed of simple mechanical parts, which may all be cheaply made of strong materials; it can be easily attached to any vehicle; it is not liable to get out of order or to be broken in use, and no dirt or obstructions can work into the exposed parts to interfere with its operations.

My invention is especially applicable to carriages and other vehicles in which it is desired to compute the fare by the distance traveled; but it may be used on any vehicles.

I am aware that it is not new to actuate a registering device on a vehicle by the turning of a wheel, and I do not broadly claim such a structure; but I am not aware of any device capable of being used on street-carriages and similar vehicles having a register near the driver's seat and in view of the passenger and driver, an actuating device attached to a wheel of the carriage, so that it cannot be operated except by turning such wheel, and simple mechanical means connecting the two to operate the register upon its shifting plane by the turning of the carriage-wheel.

Having thus described my invention, what I claim as new, and desire to secure by Letters Patent, is—

1. A carriage provided with a distance-register disposed near the driver's seat and in view of passenger and driver, in combination with the eccentric D, strap G, and arm K, adapted to receive a reciprocating movement from a wheel of the carriage, and a suitable device, as the rod $a$, carrier O, and rope $b$, adapted to communicate such movement to the register to operate the same, substantially as described.

2. In a distance-register for carriages, the eccentric D, strap G, arm K, and rod $a$, in combination with a floating carrier, as O, adapted to be operated by the rod $a$ on a shifting plane, substantially as described.

3. In a distance-register for carriages, the floating carrier O, rope $b$, and register near the driver's seat, in combination with the eccentric D, strap G, and arm K, actuated by a wheel of the carriage, adapted to impart a reciprocating movement to the carrier O, substantially as described.

4. In a distance-register for carriages, the scale, as S, index-carrier $d$, rod $f$, ratchet $g$, rod $p$, and means, as the rope $b$, to operate the rod $p$, in combination with the reciprocating lever $k$, adapted to engage with and be operated by the rod $p$ for a determined part of the scope of movement of the rod $p$, then to be disengaged therefrom, and to re-engage therewith when the rod $p$ assumes its normal position, substantially as described.

5. In a distance-register for carriages, an index-scale, as S, index-carrier $d$, provided with the handle R and its connections for setting the same on the rod $f$, the actuating-rod $f$ and its connections, in combination with the notched way $e'$ and catch $y$, adapted to permit the index to be moved freely in one direction, and to prevent movement in the opposite direction, substantially as described.

EMIL SCHUCHARDT.

Witnesses:
OSCAR J. WEEKS,
NELSON ZABRISKIE.